(12) United States Patent
Xue et al.

(10) Patent No.: US 10,680,730 B2
(45) Date of Patent: Jun. 9, 2020

(54) TESTING WIRELESS NETWORKS USING RANDOM WIRELESS DEVICE LOCATIONS

(71) Applicant: Telefonaktiebolaget LM Ericsson (publ), Stockholm (SE)

(72) Inventors: Guoqiang Xue, Kanata (CA); Eric Jerumanis, Carp (CA); Bengt Strom, Bromma (SE); Dimple Thomas, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/478,324

(22) PCT Filed: Nov. 6, 2017

(86) PCT No.: PCT/IB2017/056935
§ 371 (c)(1),
(2) Date: Jul. 16, 2019

(87) PCT Pub. No.: WO2019/086941
PCT Pub. Date: May 9, 2019

(65) Prior Publication Data
US 2020/0014476 A1 Jan. 9, 2020

(51) Int. Cl.
*H04W 16/18* (2009.01)
*H04B 17/391* (2015.01)

(52) U.S. Cl.
CPC ........ *H04B 17/3912* (2015.01); *H04W 16/18* (2013.01)

(58) Field of Classification Search
CPC .... H04B 17/00; H04B 17/12; H04B 17/3912; H04L 27/12; H04W 16/02; H04W 72/42;
(Continued)

(56) References Cited

U.S. PATENT DOCUMENTS

2010/0278137 A1* 11/2010 Kwon ................ H04J 13/0059
370/330
2015/0223181 A1* 8/2015 Noh ...................... H04L 5/0048
370/329
(Continued)

OTHER PUBLICATIONS

International Search Report and Written Opinion of the International Searching Authority dated Jul. 12, 2018 issued in PCT Application No. PCT/IB2017/056935, consisting of 13 pages.
(Continued)

*Primary Examiner* — Thanh C Le
(74) *Attorney, Agent, or Firm* — Christopher & Weisberg, P.A.

(57) ABSTRACT

An apparatus for emulating a wireless network is provided. The apparatus includes processing circuitry configured to: generate a random number corresponding to an angle between a boresight of an antenna of a network node and a direction of a first wireless device, generate a random number corresponding to a path loss between the first wireless device and the antenna of the network node, determine network performance of the first wireless device based at least in part on the generated random number corresponding to the angle between the boresight of the antenna of the network node and the direction of the first wireless device and the generated random number corresponding to the path loss between the first wireless device and the antenna of the network node, and determine performance of the wireless network based at least in part on the determined network performance of the first wireless device.

20 Claims, 4 Drawing Sheets

(58) Field of Classification Search
CPC .. H04W 72/046; H04W 72/048; G04W 16/18
See application file for complete search history.

(56) References Cited

U.S. PATENT DOCUMENTS

2018/0288755 A1* 10/2018 Liu .................... H04W 72/048
2019/0159188 A1*  5/2019 Sadiq .................. H04B 7/08
2019/0349964 A1* 11/2019 Liou .................. H04W 72/042

OTHER PUBLICATIONS

Moysen et al.,"Reinforcement Learning Based Solution for Self-Healing in LTE Networks", Sep. 14, 2014 IEEE 80th Vehicular Technology Conference, XP032695850, consisting of 6 pages.
Polaris Wireless Description of System Level Simulation Methodology for RFPM in TR 36.809; 3GPP Draft; R4-115156; Agenda Item: 9.7; Document for: Approval; Zhuhai, People's Republic of China, Oct. 10, 2011, consisting of 7 pages.

* cited by examiner

TESTING WIRELESS NETWORKS USING RANDOM WIRELESS DEVICE LOCATIONS

CROSS-REFERENCE TO RELATED APPLICATIONS

This application is a Submission Under 35 U.S.C. § 371 for U.S. National Stage Patent Application of International Application Number: PCT/IB2017/056935, filed Nov. 6, 2017 entitled "TESTING WIRELESS NETWORKS USING RANDOM WIRELESS DEVICE LOCATIONS," the entirety of which is incorporated herein by reference.

TECHNICAL FIELD

Wireless communication and in particular, a method and apparatus for testing wireless networks in a laboratory environment using random wireless device locations.

BACKGROUND

Wireless products such as base stations, access points and wireless devices need to be thoroughly tested during the development phase before being deployed in commercial networks. Ideally these wireless products should be tested in the same way as they will be used. For example, wireless devices will be used to transmit and receive signals over the air, so the ideal test environment is over the air.

Driving test is commonly used for over the air testing. To perform a driving test, a vehicle, or multiple vehicles, are required to carry the wireless device(s). In order to test base station capacity in an over-the-air network, hundreds if not thousands of wireless devices are needed, not to mention that each and every wireless device requires an operator. Thus, the cost of conducting over-the-air capacity testing is prohibitive.

An alternative solution to over the air testing is to perform testing in a laboratory environment. In laboratory testing, a base station and wireless device are connected using Radio Frequency cables. Between the base station and wireless device, equipment such as a channel emulator can be added to emulate wireless communication channels. Using the channel emulator, wireless devices can be tested extensively. Some existing channel emulators include a feature known as a Geometry Based Channel Model (GBCM). The GBCM feature can simulate wireless device locations in a cabled lab environment and is used to test advanced features of the wireless device such as beamforming, Advanced Antenna System (AAS) and massive Multiple Input Multiple Output (MIMO), etc.

Existing GBCM features do suffer from various limitations in that a wireless device is either placed at a fixed location or is moving along a predefined drive route(s) due to the channel emulation. In either case, the system under test is evaluated at predetermined locations. Performance measured at those pre-determined locations is not a true representation of the system wide performance of the system, and it is the system wide (or network wide) performances that are closely monitored by the wireless providers. Hence, the use of predetermined locations for channel emulation for wireless device testing is lacking.

To further explain the shortcomings of the existing channel emulation schemes, beamforming will be discussed within the context of the channel emulator. Performance of the beamforming algorithm is dependent on a geographical location of the wireless device. At different azimuths, the benefit of beamforming algorithm (relative to non-beamforming) can vary due to non-uniform antenna beam patterns. To characterize network wide performance, measurement samples collected from a large quantity of uniformly distributed random locations would be needed.

Further, channel emulators are not the only piece of equipment that can emulate wireless channels. Existing wireless device simulators that are used to simulate hundreds or thousands of wireless devices also have the capability to emulate time-varying RF channels. However, the channel emulation capability of these wireless device simulators is limited. For instance, the wireless device simulators do not have the ability to emulate the GBCM feature, discussed above. As such, known wireless device simulators have limited use in testing beamforming and AAS.

In summary, due to various limitations associated with existing channel emulators and wireless device simulators, existing system are not able to provide accurate results to predict network wide performance.

SUMMARY

The instant disclosure solves at least some of the problems with existing system, at least in part, by implementing "wireless device location drops". In each wireless device location drop, one or multiple wireless devices are logically placed at random locations in the network using a channel emulator. Network performance is then tested for a predefined duration before the next location drop occurs. After large amounts of location drops are carried out, performance of the system under test is evaluated over all the locations, thereby providing a system for accurately emulating network performance across a geographic area covered by the network. In particular, since the wireless devices are placed at random locations in each location drop, during the course of numerous location drops large quantity of locations are sampled for determining network performance Assuming a uniformly distributed random procedure is employed for averaging network performance, network performance is evaluated across the entire geographical area covered by the network without being biased towards any particular location(s). Performance has strong dependency on location bias with respect to certain locations in the network, but the disclosure provides an apparatus and method for removing direction bias from the network performance testing, i.e., removes direction bias caused in existing system that use dedicated locations.

According to one aspect of the disclosure, an apparatus for emulating a wireless network is provided. The apparatus includes processing circuitry configured to: generate a random number corresponding to an angle between a boresight of an antenna of a network node and a direction of a first wireless device, generate a random number corresponding to a path loss between the first wireless device and the antenna of the network node, determine network performance of the first wireless device based at least in part on the generated random number corresponding to the angle between the boresight of the antenna of the network node and the direction of the first wireless device and the generated random number corresponding to the path loss between the first wireless device and the antenna of the network node, and determine performance of the wireless network based at least in part on the determined network performance of the first wireless device.

According to one embodiment of this aspect, the processing circuitry is further configured to: generate a weighting vector based on the generated random number that corresponds to the angle between the boresight of the antenna of the network node and the direction of the first wireless device, and apply the weighting vector to an uplink channel from the first wireless device and to a downlink channel to the first wireless device. The determined network performance of the first wireless device is further based at least in part on the applied weighting vector. According to one embodiment of this aspect, the weighting vector is defined as $[0, \varphi_1, \ldots, \varphi_{n-1}]$ where n is a number of antenna elements in the antenna of the network node 12, the weighting vector being based at least in part on the generated random number corresponding to the angle between the boresight of the antenna of the network node and the direction of the first wireless device. According to one embodiment of this aspect, the weighting vector is used to emulate a location of the first wireless device with the wireless network. According to one embodiment of this aspect, the weighting vector is associated with a direction of arrival of the first wireless device with respect to the antenna of the network node.

According to one embodiment of this aspect, the processing circuitry is further configured to apply the path loss associated with the first wireless device to an uplink channel from the first wireless device and to a downlink channel to the first wireless device. The determined network performance of the first wireless device is based at least in part on applied path loss associated with the first wireless device.

According to one embodiment of this aspect, the processing circuitry is further configured to: generate a plurality of random numbers corresponding to a plurality of angles between a plurality of boresights of the antenna of the network node and a plurality of directions of a plurality of wireless devices other than the first wireless device, generate a plurality of random numbers corresponding to a plurality of path losses between the plurality of wireless devices and antenna of the network node, and determine network performance of the plurality of wireless devices based at least in part on: the generated plurality of random numbers corresponding to the plurality of angles between the plurality of boresights of the antenna of the network node and the plurality of directions of a plurality of wireless devices, and the generated plurality of random numbers corresponding to the plurality of path losses between the plurality of wireless devices and antenna of the network node. The determined network performance of the wireless network is based at least in part on the determined network performance of the plurality of wireless devices.

According to one embodiment of this aspect, the network performance of the first wireless device includes at least one key performance indicator, the at least one key performance indicator including at least one taken from a group consisting of throughput and a number of dropped calls. According to one embodiment of this aspect, the apparatus is one taken from a group of a channel emulator, a wireless device and a network node. According to one embodiment of this aspect, both the generated random number corresponding to the angle between a boresight of the antenna of the network node and the direction of the first wireless device and the generated random number corresponding to the path loss between the first wireless device and the antenna of the network node correspond to a position of a random virtual placement of the first wireless device within the wireless network.

According to another aspect of the disclosure, a method for emulating a wireless network is provided. A random number corresponding to an angle between a boresight of an antenna of a network node and a direction of a first wireless device is generated. A random number corresponding to a path loss between the first wireless device and the antenna of the network node is generated. Network performance of the first wireless device is determined based at least in part on the generated random number corresponding to the angle between the boresight of the antenna of the network node and the direction of the first wireless device and the generated random number corresponding to the path loss between the first wireless device and the antenna of the network node. Performance of the wireless network is determined based at least in part on the determined network performance of the first wireless device.

According to one embodiment of this aspect, a weighting vector is generated based on the generated random number that corresponds to the angle between the boresight of the antenna of the network node and the direction of the first wireless device. The weighting vector is applied to an uplink channel from the first wireless device and to a downlink channel to the first wireless device. The determined network performance of the first wireless device is further based at least in part on the applied weighting vector. According to one embodiment of this aspect, the weighting vector is defined as $[0, \varphi_1, \ldots, \varphi_{n-1}]$ where n is a number of antenna elements in the antenna of the network node. The weighting vector is based at least in part on the generated random number corresponding to the angle between the boresight of the antenna of the network node and the direction of the first wireless device. According to one embodiment of this aspect, the weighting vector is used to emulate a location of the first wireless device within the wireless network.

According to one embodiment of this aspect, the weighting vector is associated with a direction of arrival of the first wireless device with respect to the antenna of the network node. According to one embodiment of this aspect, the path loss associated with the first wireless device is applied to an uplink channel from the first wireless device and to a downlink channel to the first wireless device. The determined network performance of the first wireless device is based at least in part on applied path loss associated with the first wireless device. According to one embodiment of this aspect, a plurality of random numbers corresponding to a plurality of angles between a plurality of boresights of the antenna of the network node and a plurality of directions of a plurality of wireless devices other than the first wireless device are generated. A plurality of random numbers corresponding to a plurality of path losses between the plurality of wireless devices and antenna of the network node are generated. Network performance of the plurality of wireless devices is determined based at least in part on: the generated plurality of random numbers corresponding to the plurality of angles between the plurality of boresights of the antenna of the network node and the plurality of directions of a plurality of wireless devices, and the generated plurality of random numbers corresponding to the plurality of path losses between the plurality of wireless devices and antenna of the network node. The determined network performance of the wireless network is based at least in part on the determined network performance of the plurality of wireless devices. According to one embodiment of this aspect, the network performance of the first wireless device includes at least one key performance indicator, the at least one key performance indicator including at least one taken from a group consisting of throughput and a number of dropped calls. According to one embodiment of this aspect, both the generated random number corresponding to the angle between a boresight of the antenna of the network node and the direction of the first wireless device and the generated random number corresponding to the path loss between the first wireless device and the antenna of the network node correspond to a position of a random virtual placement of the first wireless device within the wireless network.

According to another embodiment of the disclosure, an apparatus for emulating a wireless network is provided. The apparatus includes an angle generation module configured to generate a random number corresponding to an angle between a boresight of an antenna of a network node and a direction of a first wireless device. The apparatus includes a path loss generation module configured to generate a random number corresponding to a path loss between the first wireless device and the antenna of the network node. The apparatus includes a wireless device performance module configured to determine network performance of the first wireless device based at least in part on the generated random number corresponding to the angle between the boresight of the antenna of the network node and the direction of the first wireless device and the generated random number corresponding to the path loss between the first wireless device and the antenna of the network node. The apparatus includes network performance module configured to determine performance of the wireless network based at least in part on the determined network performance of the first wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to testing wireless networks in a lab using random emulated wireless device locations. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The term wireless device used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles, etc.

The term "network node" used herein may refer to a radio network node or another network node, e.g., a core network node, Mobile Switching Center (MSC), Mobility Management Entity (MME), Operations and Maintenance (O&M), Operations System Support (OSS), SON, positioning node (e.g. (Evolved Serving Mobile Location Center (E-SMLC)), Minimization Drive Test (MDT) node, etc.

The term "network node" as used herein can be any kind of network node, e.g., a core network node, Mobile Switching Center (MSC), Mobility Management Entity (MME), Operations and Maintenance (O&M), Operations System Support (OSS), SON, positioning node (e.g. (Evolved Serving Mobile Location Center (E-SMLC)), Minimization Drive Test (MDT) node, etc. Network node may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Note further, that functions described herein as being performed by a wireless device, a network node and/or an apparatus may be distributed over a plurality of wireless devices and/or network nodes. In other words, it is contemplated that the functions of the network node and wireless device described herein are not limited to performance by a single physical device and, in fact, can be distributed among several physical devices.

Figure 1:
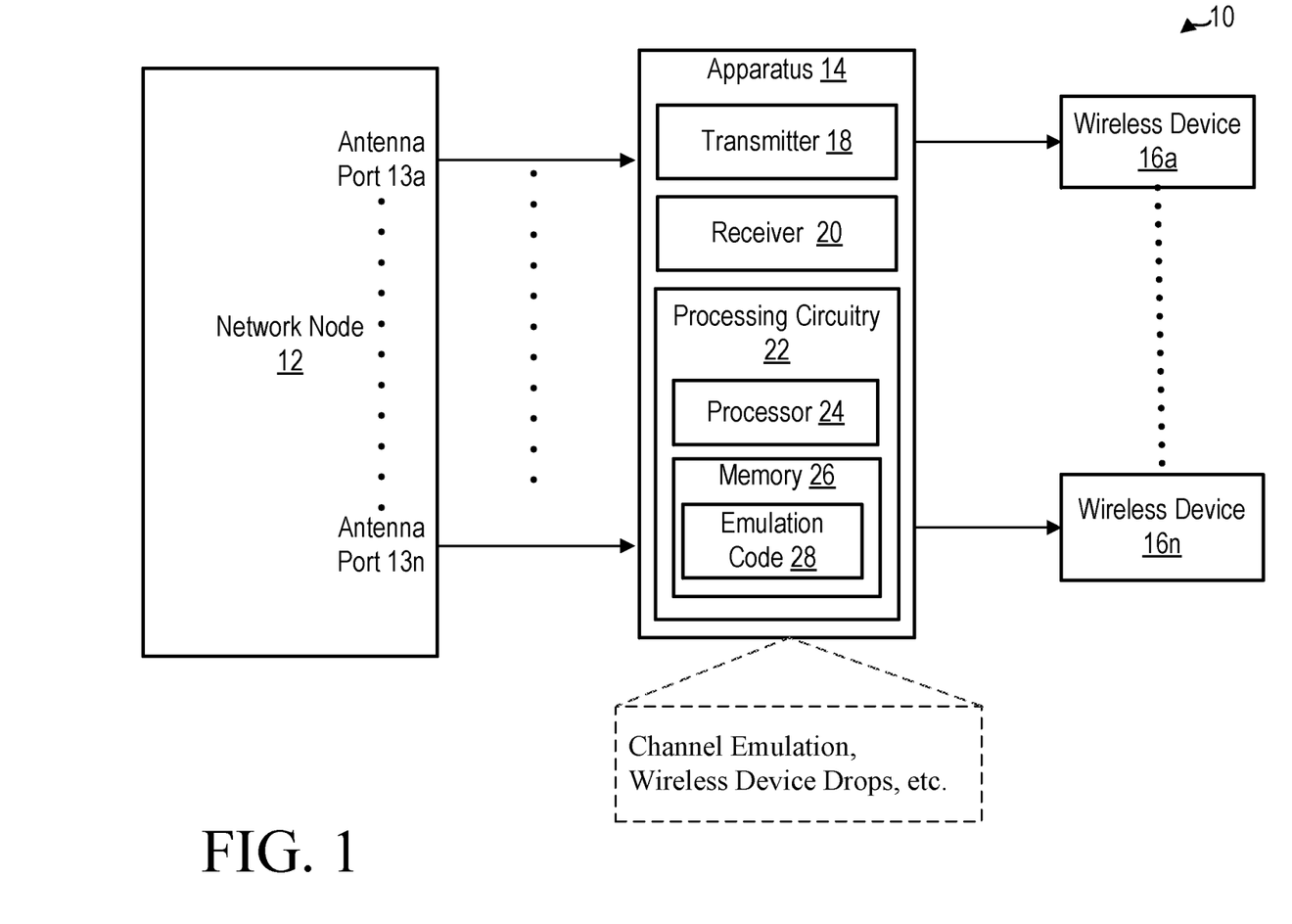
FIG. 1 is block diagram of an example system for testing wireless networks in a lab using random emulated wireless device locations in accordance with the principles of the disclosure.

Referring now to drawing figures in which like reference designators refer to like elements there is shown in FIG. 1 an exemplary system for testing wireless networks in a laboratory using random emulated wireless device locations in accordance with the principles of some embodiments of the present disclosure and designated generally as "10." In particular, FIG. 1 is a lab setup used for testing wireless products such as network node 12 that includes antenna ports 13a-13n, and wireless device 16. One or more antenna ports 13a-13n are configured to transmit and/or receive communications from apparatus 14 and wireless device 16 as described herein. One or more antenna ports 13a-13n of network node 12 are referred to as antenna port 13. Systems under test (SUT) can be network node 12 and/or wireless device 16. SUT are agnostic to wireless technologies, meaning this setup can be used to test Long Term Evolution (LTE), wideband code vision multiple access (WCDMA) and global system for wireless communication (GSM) technologies, as well as future 5G (New Radio) technologies, other 3$^{rd}$ Generation Partnership Project (3GPP) technologies and non-3GPP technologies such as IEEE 802.11.

System 10 includes one or more network nodes 12a-12n (collectively referred to as network node 12), apparatus 14 and one or more wireless devices 16a-16n, in communication with each other via one or more radio frequency (RF) cables using one or more communication protocols. For example, one or more wireless devices 16 are in communication with one or more antenna ports 13 of network node 12 via apparatus 14. Apparatus 14 is configured to perform the processes described herein, and network node 12 and wireless device 16 perform processes for wireless communication as are known in the art. In one or more embodiments, network node 12 includes one or multiple digital units and radio units. To perform end-to-end testing, network node 12 is also connected to radio network controller (RNC) and core network, both of which are not shown. The connection between network node 12 and apparatus 14 may use RF cables.

In one or more embodiments, apparatus 14 is a channel emulator. In one or more embodiments, apparatus 14 is a mobile simulator. Apparatus 14 includes one or more transmitters 18 and one or more receivers 20 for communicating with one or more network nodes 12, wireless device 16, and/or other elements in system 10. In one or more embodiments, transmitter 18 and/or receiver 20 includes one or more communication interfaces. Although FIG. 1 shows a separate transmitter 18 and receiver 20, implementations are not limited to such and it is contemplated that an integrated transceiver(s) can be used.

Apparatus 14 also includes processing circuitry 22. Processing circuitry 22 includes processor 24 and memory 26. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry). Processor 24 may be configured to access (e.g., write to and/or reading from) memory 26, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 26 may be configured to store code executable by processor 24 and/or other data, e.g., data pertaining to communication, e.g., configuration and/or address data of nodes, etc.

Processing circuitry 22 may be configured to control any of the methods and/or processes described herein and/or to cause such methods and/or processes to be performed, e.g., by wireless device 16. Processor 24 corresponds to one or more processors 24 for performing apparatus 14 functions described herein. Apparatus 14 includes memory 26 that is configured to store data, programmatic software code and/or other information described herein. In one or more embodiments, memory 26 is configured to store emulation code 28. For example, emulation code 28 includes instructions that, when executed by processor 24, causes processor 24 to perform the process discussed in detail with respect to FIG. 2 and embodiments discussed herein. Emulation code 28 provides apparatus 14 such as a channel emulator with the capability of altering simulated wireless device 16 locations on the fly to help ensure wireless devices 16 are logically situated at random locations, i.e., wireless devices 16 are virtually placed within the wireless network.

In one or more embodiments, apparatus 14 adjusts attenuation between the network node 12 and wireless device 16 such as via one or more channel attenuators in order to alter one or more of amplitude, phase and timing of the input signals to emulate wireless communication channels with certain random characteristics. In some embodiments, the channel attenuators are implemented using the processing circuitry 22. In one or more embodiments, apparatus 14, via processing circuitry 22, alters one or more of amplitude, phase and timing of the input signals to emulate wireless communication channels with certain random characteristics.

In one or more embodiments, emulation code 28 is included in network node 12 and/or wireless device 16 such that the emulation process described herein is performed by entities in system 10 other than apparatus 14.

Figure 2:
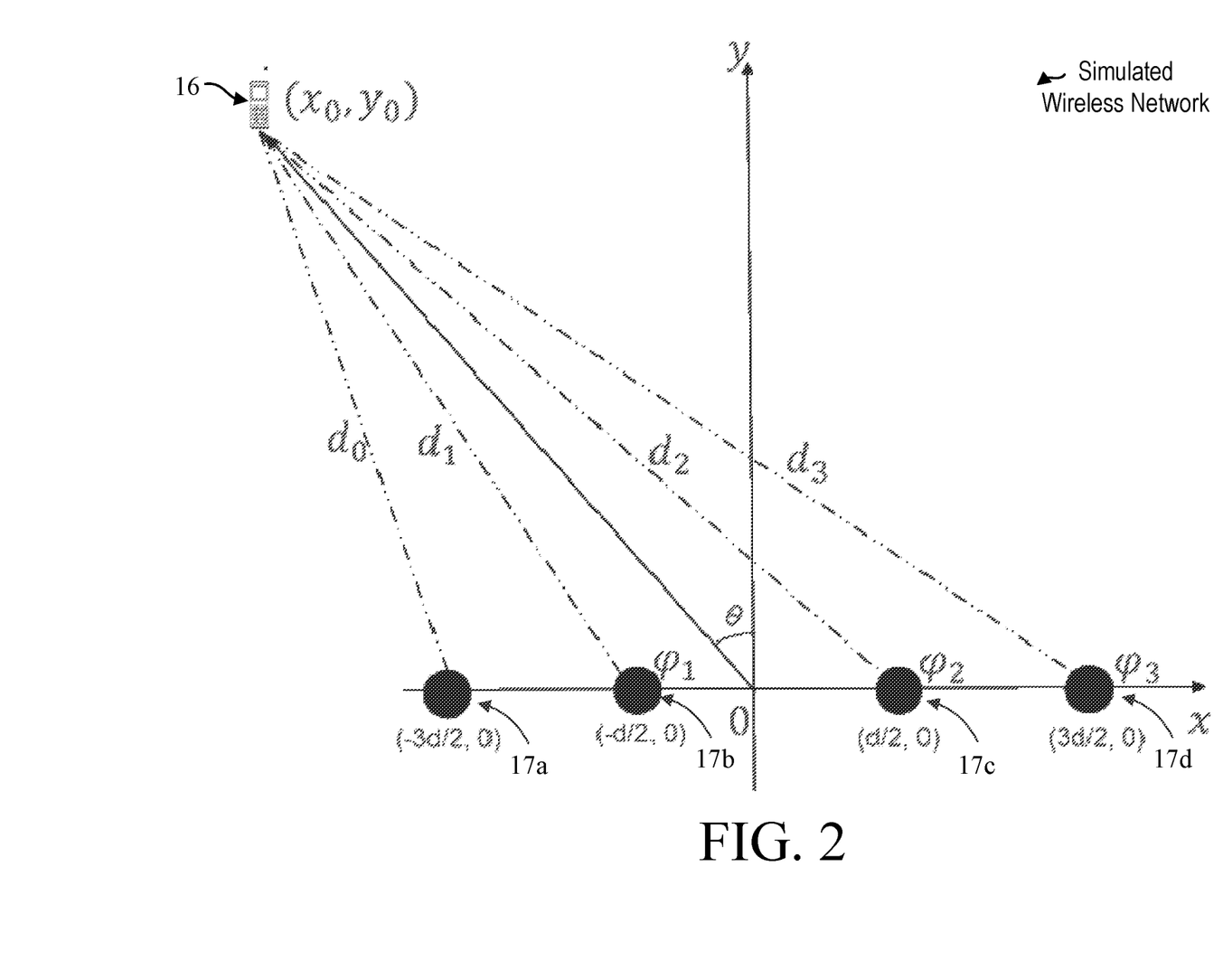
FIG. 2 is a diagram of an example of emulating of wireless device locations in a multi-array antenna system in accordance with the principles of the disclosure.

FIG. 2 is a diagram of an example of emulating of wireless device 16 locations in a multi-array antenna system in a simulated wireless network using emulation code 28 in accordance with the principles of the disclosure. A 4-element uniform linear array (ULA) antenna including antenna elements 17a-17d is used in FIG. 2 for illustration purpose but other n-element antenna arrays are applicable in accordance with the teachings of the disclosure. One or more antenna elements 17a-17d are herein referred to as antenna element 17. While FIG. 2 illustrates a simulated wireless device location in a simulated wireless network, in real world operation one or more antenna elements 17a-17d are connected to one or more antenna ports 13a-13n for transmitting/receiving communications from wireless device 16. Spacing between each antenna element 17 of the ULA is d. Below are the steps of simulating wireless device 16 location. It is assumed that a single wireless device 16 is situated at $(x_0, y_0)$.

One example of steps for simulating the location wireless device 16 is:

1. Calculate $d_1$, $d_2$, $d_3$ and $d_4$, the distance between each antenna element 17 and the wireless device 16;
2. Calculate delta distance $\delta_{21}$, $\delta_{31}$ and $\delta_{41}$, where:

$\delta_{21}=d_2-d_1$; $\delta_{31}=d_3-d_1$; $\delta_{41}=d_4-d_1$;

3. Calculate delta in arrival time, i.e., convert delta in distance to delta in time:

$\tau_{21}=\delta_{21}/c$; $\tau_{31}=\delta_{31}/c$; $\tau_{41}=\delta_{41}/c$;

where c is the speed of light
4. Calculate delta in phase, i.e. convert delta in time to delta in phase in degrees.

$\varphi_1=360 f \delta_{21}$; $\varphi_2=360 f \delta_{31}$; $\varphi_3=360 f \delta_{41}$;

where f is the center frequency of the carrier.

In other words, to simulate wireless device 16 as being located at $(x_0, y_0)$, a weighting vector $[0, \varphi_1, \varphi_2, \varphi_3]$ is applied to the antenna elements 17 which correspond to the four receivers 20 of apparatus 14. In one or more embodiments, the weighting vector is defined as $[0, \varphi 1, \ldots, \varphi n-1]$ where n is a number of antenna elements 17 in the antenna of the network node 12. The weighting vector uniquely determines the direction of arrival (θ) of wireless device 16. At each receiver 20 of apparatus 14, an attenuation is applied which corresponds to the distance of wireless device 16 to the origin of the antenna array. The angle of arrival and distance (simulated by attenuation or path loss) uniquely determines the location of wireless device 16.

Application of the teachings of the disclosure are not limited to a channel emulator. In the case where channel emulation functionality is implemented in the wireless device simulator and no external channel emulator is used, wireless device 16 location can also be simulated by altering the phases and path losses of each and every transmit and receive port that is connected to network node 12 antenna port 13.

Figure 3:
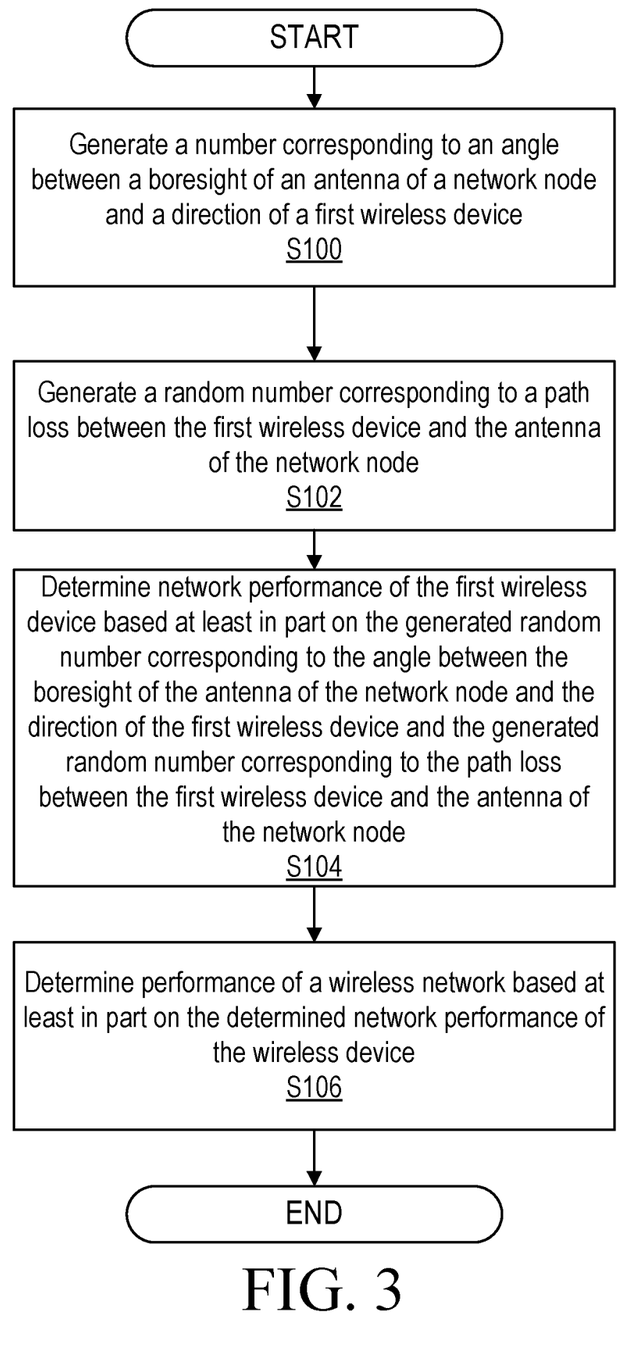
FIG. 3 is an example flow chart of the emulation process of emulation code in accordance with the principles of the disclosure.

FIG. 3 is an example flow chart of the emulation process of emulation code 28 in accordance with the principles of the disclosure. In particular, given the teachings for emulating the location of wireless device 16, above, the emulated wireless device 16 location is used to determine network performance by considering the performance of one or more wireless devices 16 in one or more simulated locations, i.e., random virtual placement of wireless devices 16, within the wireless network, thereby, for example, providing network performance metrics based on various wireless devices 16 operating in various simulated locations within the wireless network. In one or more embodiments, assuming a uniformly distributed random procedure is employed for averaging network performance of wireless devices 16, network performance is evaluated across the entire geographical area covered by the network without being biased towards any particular location(s). In other words, while network performance has strong dependency on location bias with respect to certain locations in the network, the disclosure advantageously removes direction bias from the network performance testing, i.e., removes direction bias caused in existing system that use dedicated locations, thereby providing an accurate portrayal of the real world overall network performance based on the network performance of wireless devices 16.

In one embodiment, processing circuitry 22 is configured to generate a random number θ corresponding to an angle between a boresight of an antenna of network node 12 and a direction of wireless device 16 (Block S100). In one or more embodiments, boresight refers to an axis of maximum radiated power of an antenna of network node 12. In one or more embodiments, the boresight and the antenna of network node 12 are simulated such that antenna port 13 of network node 12 is connected to transmitter 18 and receiver 20 of apparatus 14 via RF cables to perform testing.

Processing circuitry 22 is configured to generate a random number PL corresponding to a path loss between wireless device 16 and the antenna of network node 12 (Block S102). Processing circuitry 22 is configured to determine network performance of the wireless device 16 based on the generated random number corresponding to the angle between the boresight of the antenna of network node 12 and the direction of wireless device 16, and the generated random number corresponding to the path loss between the first wireless device and the antenna of network node 12 (Block S104). In one or more embodiments, determining network performance of the wireless device 16 includes at least one of:

calculating a weighting vector [0, $\varphi_1$, $\varphi_2$, $\varphi_3$] such as based on the steps for simulating wireless device 16 location described above;

applying the weighting vector [0, $\varphi_1$, $\varphi_2$, $\varphi_3$] to both uplink and downlink.

The weighting vector introduces phase shift to a signal that the weighting vector is applied to;

applying a path loss PL to both uplink and downlink, which reduces the power of the signal by PL dB; and running a test for a predefined duration T.

Processing circuitry 22 is configured to determine performance of a network based at least in part on the determined network performance of the wireless device 16 (Block S106). In one or more embodiments, network performance includes a key performance indicator (KPI) metric such as throughput, dropped calls, etc. In one or more embodiments, a dropped call is defined as a connected call that is terminated/disconnected due to a technical reason before the parties that are part of the call would wish to do so).

In one or more embodiments, determining network performance includes repeating Blocks S100-S104 for a predefined number of iterations i, and evaluating performance of the system under test with data collected over the entire i iterations.

In one or more embodiments, the channel emulation process includes one or more of the following steps:

1. Generating a random number/angle θ, which corresponds to the angle between the antenna boresight and the direction of the mobile, i.e. relates to direction.
2. Generating another random number PL, which corresponds to the path loss between the mobile and the base station antenna, i.e., relates to distance;
3. Calculating a weighting vector [0, $\varphi_1$, $\varphi_2$, $\varphi_3$] based on θ, as described above;
4. Applying the weighting vector [0, $\varphi_1$, $\varphi_2$, $\varphi_3$] to uplink and/or downlink. The weighting vector introduces phase shift to the signal it applies to, thereby emulating direction of arrival of the wireless device;
5. Applying a path loss PL to both uplink/uplink channel and downlink/downlink channel, which reduces the power of the signal by PL dB;
6. Running the test for a predefined duration T. For example, the random location drop or virtual placement of wireless device 16 within the network is tested for a predefined time period after the location drop such as 10 seconds;
7. Repeating steps 1 through 6 for predefined number of iterations i, i.e., for i number of wireless devices 16; and
8. Evaluating performance of the system under test with data collected over the entire I iterations.

The random location drop concept described herein can be extended to a multiple wireless device 16 scenario using the steps and disclosure described above. For the i-wireless device 16, a weighting vector/path-loss pair $\Phi_i$, $PL_i$) is generated and applied for each wireless device 16. In one or more embodiments, the rest of the method remains unchanged.

In one or more embodiments, the teachings provided in the disclosure relate to the random location drop concept that is implemented in test equipment. In one or more embodiments, the teachings provided in the disclosure provide a method to model wireless device position using direction and path loss.

Figure 4:
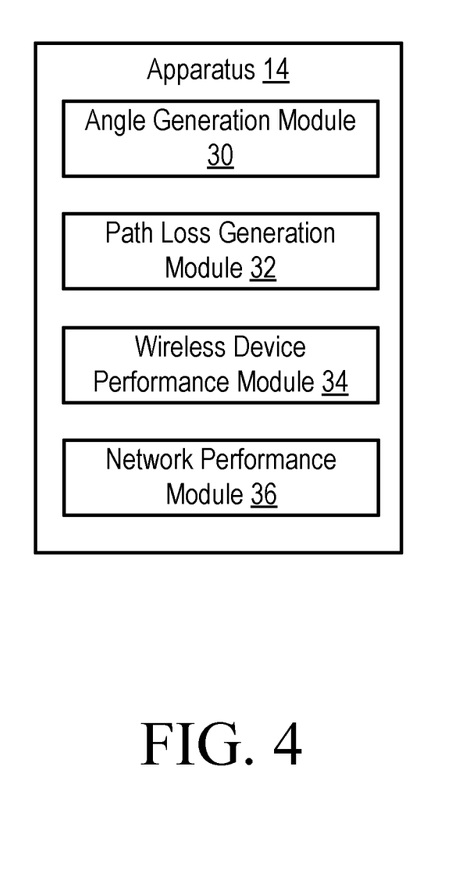
FIG. 4 is another embodiment of apparatus in accordance with the principles of the disclosure.

FIG. 4 is another embodiment of apparatus 14 in accordance with the principles of the disclosure. Angle generation module 30 is configured to generate a random number corresponding to an angle between a boresight of an antenna of network node 12 and a direction of wireless device 16, as described herein. Path loss generation module 32 is configured to generate a random number corresponding to a path loss between the first wireless device and the antenna of network node 12, as described herein. Wireless device performance module 34 is configured to determine network performance of wireless device 16 based the generated random number corresponding to the angle between the boresight of the antenna of network node 12 and the direction of wireless device 16 and the generated random number corresponding to the path loss between wireless device 16 and the antenna of network node 12, as described herein. Network performance module 36 is configured to determine performance of a network based at least in part on the determined network performance of wireless device 16, as described herein.

According to one aspect of the disclosure, an apparatus 14 for emulating a wireless network is provided. The apparatus 14 includes processing circuitry 22 configured to: generate a random number corresponding to an angle between a boresight of an antenna of a network node 12 and a direction of a first wireless device 16, generate a random number corresponding to a path loss between the first wireless device 16 and the antenna of the network node 12, determine network performance of the first wireless device 16 based at least in part on the generated random number corresponding to the angle between the boresight of the antenna of the network node 12 and the direction of the first wireless device 16 and the generated random number corresponding to the path loss between the first wireless device 16 and the antenna of the network node 12, and determine performance of the wireless network based at least in part on the determined network performance of the first wireless device 16.

According to one embodiment of this aspect, the processing circuitry 22 is further configured to: generate a weighting vector based on the generated random number that corresponds to the angle between the boresight of the antenna of the network node 12 and the direction of the first wireless device 16, and apply the weighting vector to an uplink channel from the first wireless device 16 and to a downlink channel to the first wireless device 16. The determined network performance of the first wireless device 16 is further based at least in part on the applied weighting vector. According to one embodiment of this aspect, the weighting vector is defined as $[0, \varphi_1, \ldots, \varphi_{n-1}]$ where n is a number of antenna elements in the antenna of the network node 12, the weighting vector being based at least in part on the generated random number corresponding to the angle between the boresight of the antenna of the network node 12 and the direction of the first wireless device 16. According to one embodiment of this aspect, the weighting vector is used to emulate a location of the first wireless device 16 with the wireless network. According to one embodiment of this aspect, the weighting vector is associated with a direction of arrival of the first wireless device 16 with respect to the antenna of the network node 12.

According to one embodiment of this aspect, the processing circuitry 22 is further configured to apply the path loss associated with the first wireless device 16 to an uplink channel from the first wireless device 16 and to a downlink channel to the first wireless device 16. The determined network performance of the first wireless device 16 is based at least in part on applied path loss associated with the first wireless device 16.

According to one embodiment of this aspect, the processing circuitry 22 is further configured to: generate a plurality of random numbers corresponding to a plurality of angles between a plurality of boresights of the antenna of the network node 12 and a plurality of directions of a plurality of wireless devices 16 other than the first wireless device 16, generate a plurality of random numbers corresponding to a plurality of path losses between the plurality of wireless devices 16 and antenna of the network node 12, and determine network performance of the plurality of wireless devices 16 based at least in part on: the generated plurality of random numbers corresponding to the plurality of angles between the plurality of boresights of the antenna of the network node 12 and the plurality of directions of a plurality of wireless devices 16, and the generated plurality of random numbers corresponding to the plurality of path losses between the plurality of wireless devices 16 and antenna of the network node 12. The determined network performance of the wireless network is based at least in part on the determined network performance of the plurality of wireless devices 16.

According to one embodiment of this aspect, the network performance of the first wireless device 16 includes at least one key performance indicator, the at least one key performance indicator including at least one taken from a group consisting of throughput and a number of dropped calls. According to one embodiment of this aspect, the apparatus 14 is one taken from a group of a channel emulator, a wireless device 16 and a network node 12. According to one embodiment of this aspect, both the generated random number corresponding to the angle between a boresight of the antenna of the network node 12 and the direction of the first wireless device 16 and the generated random number corresponding to the path loss between the first wireless device 16 and the antenna of the network node 12 correspond to a position of a random virtual placement of the first wireless device 16 within the wireless network.

According to another aspect of the disclosure, a method for emulating a wireless network is provided. A random number corresponding to an angle between a boresight of an antenna of a network node 12 and a direction of a first wireless device is generated. A random number corresponding to a path loss between the first wireless device 16 and the antenna of the network node is generated. Network performance of the first wireless device 16 is determined based at least in part on the generated random number corresponding to the angle between the boresight of the antenna of the network node 12 and the direction of the first wireless device 16 and the generated random number corresponding to the path loss between the first wireless device 16 and the antenna of the network node 12. Performance of the wireless network is determined based at least in part on the determined network performance of the first wireless device 16.

According to one embodiment of this aspect, a weighting vector is generated based on the generated random number that corresponds to the angle between the boresight of the antenna of the network node 12 and the direction of the first wireless device 16. The weighting vector is applied to an uplink channel from the first wireless device 16 and to a downlink channel to the first wireless device 16. The determined network performance of the first wireless device 16 is further based at least in part on the applied weighting vector. According to one embodiment of this aspect, the weighting vector is defined as $[0, \varphi_1, \ldots, \varphi_{n-1}]$ where n is a number of antenna elements in the antenna of the network node 12. The weighting vector is based at least in part on the generated random number corresponding to the angle between the boresight of the antenna of the network node 12 and the direction of the first wireless device 16. According to one embodiment of this aspect, the weighting vector is used to emulate a location of the first wireless device 16 within the wireless network.

According to one embodiment of this aspect, the weighting vector is associated with a direction of arrival of the first wireless device 16 with respect to the antenna of the network node 12. According to one embodiment of this aspect, the path loss associated with the first wireless device 16 is applied to an uplink channel from the first wireless device 16 and to a downlink channel to the first wireless device 16. The determined network performance of the first wireless device 16 is based at least in part on applied path loss associated with the first wireless device 16. According to one embodiment of this aspect, a plurality of random numbers corresponding to a plurality of angles between a plurality of boresights of the antenna of the network node 12 and a plurality of directions of a plurality of wireless devices 16 other than the first wireless device 16 are generated. A plurality of random numbers corresponding to a plurality of path losses between the plurality of wireless devices 16 and antenna of the network node 12 are generated. Network performance of the plurality of wireless devices 16 is determined based at least in part on: the generated plurality of random numbers corresponding to the plurality of angles between the plurality of boresights of the antenna of the network node 12 and the plurality of directions of a plurality of wireless devices 16, and the generated plurality of random numbers corresponding to the plurality of path losses between the plurality of wireless devices 16 and antenna of the network node 12. The determined network performance of the wireless network is based at least in part on the determined network performance of the plurality of wireless devices 16. According to one embodiment of this aspect, the network performance of the first wireless device 16 includes at least one key performance indicator, the at least one key performance indicator including at least one taken from a group consisting of throughput and a number of dropped calls. According to one embodiment of this aspect, both the generated random number corresponding to the angle between a boresight of the antenna of the network node 12 and the direction of the first wireless device 16 and the generated random number corresponding to the path loss between the first wireless device 16 and the antenna of the network node 12 correspond to a position of a random virtual placement of the first wireless device 16 within the wireless network.

According to another embodiment of the disclosure, an apparatus 14 for emulating a wireless network is provided. The apparatus includes an angle generation module 30 configured to generate a random number corresponding to an angle between a boresight of an antenna of a network node 12 and a direction of a first wireless device 16. The apparatus includes a path loss generation module 32 configured to generate a random number corresponding to a path loss between the first wireless device 16 and the antenna of the network node 12. The apparatus includes a wireless device performance module 34 configured to determine network performance of the first wireless device 16 based at least in part on the generated random number corresponding to the angle between the boresight of the antenna of the network node 12 and the direction of the first wireless device 16 and the generated random number corresponding to the path loss between the first wireless device 16 and the antenna of the network node 12. The apparatus includes network performance module 36 configured to determine performance of the wireless network based at least in part on the determined network performance of the first wireless device 16.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An apparatus for emulating a wireless network, the apparatus comprising:
processing circuitry configured to:
generate a random number corresponding to an angle between a boresight of an antenna of a network node and a direction of a first wireless device;
generate a random number corresponding to a path loss between the first wireless device and the antenna of the network node;
determine network performance of the first wireless device based at least in part on the generated random number corresponding to the angle between the boresight of the antenna of the network node and the direction of the first wireless device and the generated random number corresponding to the path loss between the first wireless device and the antenna of the network node; and
determine performance of the wireless network based at least in part on the determined network performance of the first wireless device.

2. The apparatus of claim 1, wherein the processing circuitry is further configured to:
generate a weighting vector based on the generated random number that corresponds to the angle between the boresight of the antenna of the network node and the direction of the first wireless device;
apply the weighting vector to an uplink channel from the first wireless device and to a downlink channel to the first wireless device; and
the determined network performance of the first wireless device being further based at least in part on the applied weighting vector.

3. The apparatus of claim 2, wherein the weighting vector is defined as $[0, \varphi_1, \ldots, \varphi_{n-1}]$ where n is a number of antenna elements in the antenna of the network node, the weighting vector being based at least in part on the generated random number corresponding to the angle between the boresight of the antenna of the network node and the direction of the first wireless device.

4. The apparatus of claim 2, wherein the weighting vector is used to emulate a location of the first wireless device with the wireless network.

5. The apparatus of claim 2, wherein the weighting vector is associated with a direction of arrival of the first wireless device with respect to the antenna of the network node.

6. The apparatus of claim 1, wherein the processing circuitry is further configured to apply the path loss associated with the first wireless device to an uplink channel from the first wireless device and to a downlink channel to the first wireless device; and
the determined network performance of the first wireless device being based at least in part on applied path loss associated with the first wireless device.

7. The apparatus of claim 1, wherein the processing circuitry is further configured to:
generate a plurality of random numbers corresponding to a plurality of angles between a plurality of boresights of the antenna of the network node and a plurality of directions of a plurality of wireless devices other than the first wireless device;
generate a plurality of random numbers corresponding to a plurality of path losses between the plurality of wireless devices and antenna of the network node;
determine network performance of the plurality of wireless devices based at least in part on:
the generated plurality of random numbers corresponding to the plurality of angles between the plurality of boresights of the antenna of the network node and the plurality of directions of a plurality of wireless devices; and
the generated plurality of random numbers corresponding to the plurality of path losses between the plurality of wireless devices and antenna of the network node; and
the determined network performance of the wireless network being based at least in part on the determined network performance of the plurality of wireless devices.

8. The apparatus of claim 1, wherein the network performance of the first wireless device includes at least one key performance indicator, the at least one key performance indicator including at least one taken from a group consisting of throughput and a number of dropped calls.

9. The apparatus of claim 1, wherein the apparatus is one taken from a group of a channel emulator, a wireless device and a network node.

10. The apparatus of claim 1, wherein both the generated random number corresponding to the angle between a boresight of the antenna of the network node and the direction of the first wireless device and the generated random number corresponding to the path loss between the first wireless device and the antenna of the network node correspond to a position of a random virtual placement of the first wireless device within the wireless network.

11. A method for emulating a wireless network, the method comprising:
generating a random number corresponding to an angle between a boresight of an antenna of a network node and a direction of a first wireless device;
generating a random number corresponding to a path loss between the first wireless device and the antenna of the network node;
determining network performance of the first wireless device based at least in part on the generated random number corresponding to the angle between the boresight of the antenna of the network node and the direction of the first wireless device and the generated random number corresponding to the path loss between the first wireless device and the antenna of the network node; and
determining performance of the wireless network based at least in part on the determined network performance of the first wireless device.

12. The method of claim 11, further comprising:
generating a weighting vector based on the generated random number that corresponds to the angle between the boresight of the antenna of the network node and the direction of the first wireless device;
applying the weighting vector to an uplink channel from the first wireless device and to a downlink channel to the first wireless device; and
the determined network performance of the first wireless device being further based at least in part on the applied weighting vector.

13. The method of claim 12, wherein the weighting vector is defined as $[0, \varphi_1, \ldots, \varphi_{n-1}]$ where n is a number of antenna elements in the antenna of the network node, the weighting vector being based at least in part on the generated random number corresponding to the angle between the boresight of the antenna of the network node and the direction of the first wireless device.

14. The method of claim 12, wherein the weighting vector is used to emulate a location of the first wireless device within the wireless network.

15. The method of claim 12, wherein the weighting vector is associated with a direction of arrival of the first wireless device with respect to the antenna of the network node.

16. The method of claim 11, further comprising applying the path loss associated with the first wireless device to an uplink channel from the first wireless device and to a downlink channel to the first wireless device; and
the determined network performance of the first wireless device being based at least in part on applied path loss associated with the first wireless device.

17. The method of claim 11, further comprising:
generating a plurality of random numbers corresponding to a plurality of angles between a plurality of boresights of the antenna of the network node and a plurality of directions of a plurality of wireless devices other than the first wireless device;
generating a plurality of random numbers corresponding to a plurality of path losses between the plurality of wireless devices and antenna of the network node;
determining network performance of the plurality of wireless devices based at least in part on:
the generated plurality of random numbers corresponding to the plurality of angles between the plurality of boresights of the antenna of the network node and the plurality of directions of a plurality of wireless devices; and
the generated plurality of random numbers corresponding to the plurality of path losses between the plurality of wireless devices and antenna of the network node; and
the determined network performance of the wireless network being based at least in part on the determined network performance of the plurality of wireless devices.

18. The method of claim 11, wherein the network performance of the first wireless device includes at least one key performance indicator, the at least one key performance indicator including at least one taken from a group consisting of throughput and a number of dropped calls.

19. The method of claim 11, wherein both the generated random number corresponding to the angle between a boresight of the antenna of the network node and the direction of the first wireless device and the generated random number corresponding to the path loss between the first wireless device and the antenna of the network node correspond to a position of a random virtual placement of the first wireless device within the wireless network.

20. An apparatus for emulating a wireless network, the apparatus comprising:
an angle generation module configured to generate a random number corresponding to an angle between a boresight of an antenna of a network node and a direction of a first wireless device;
a path loss generation module configured to generate a random number corresponding to a path loss between the first wireless device and the antenna of the network node;
wireless device performance module configured to determine network performance of the first wireless device based at least in part on the generated random number corresponding to the angle between the boresight of the antenna of the network node and the direction of the first wireless device and the generated random number corresponding to the path loss between the first wireless device and the antenna of the network node; and
network performance module configured to determine performance of the wireless network based at least in part on the determined network performance of the first wireless device.

* * * * *